US012779541B2

(12) United States Patent
Muranaka et al.

(10) Patent No.: US 12,779,541 B2
(45) Date of Patent: Nov. 3, 2026

(54) ADDITIVE MANUFACTURING APPARATUS AND METHOD OF ADDITIVE MANUFACTURING AN OBJECT

(71) Applicant: Sodick Co., Ltd., Kanagawa (JP)

(72) Inventors: Katsutaka Muranaka, Kanagawa (JP); Yoshitaka Kato, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 575 days.

(21) Appl. No.: 18/183,179

(22) Filed: Mar. 14, 2023

(65) Prior Publication Data

US 2023/0294174 A1 Sep. 21, 2023

(30) Foreign Application Priority Data

Mar. 18, 2022 (JP) ................................ 2022-044050

(51) Int. Cl.
*B22F 12/20* (2021.01)
*B22F 10/28* (2021.01)
(Continued)

(52) U.S. Cl.
CPC .............. *B22F 12/20* (2021.01); *B22F 10/28* (2021.01); *B22F 10/30* (2021.01); *B22F 12/30* (2021.01);
(Continued)

(58) Field of Classification Search
CPC .......... B22F 12/17; B22F 12/20; B22F 12/30; B22F 10/85; B29C 64/245; B29C 64/393; B33Y 50/02
See application file for complete search history.

(56) References Cited

U.S. PATENT DOCUMENTS 11,471,945 B2 10/2022 Nakamura et al.
2010/0273114 A1* 10/2010 Yoshida .............. G03F 7/70875 165/300
(Continued)

FOREIGN PATENT DOCUMENTS

CN 112496349 3/2021
JP 2005315488 11/2005
(Continued)

OTHER PUBLICATIONS

Espacenet machine translation of Oda et al., JP2021115625A (originally published 2021) (Year: 2021).*
(Continued)

*Primary Examiner* — Larry W Thrower
*Assistant Examiner* — Jennifer L Groux
(74) *Attorney, Agent, or Firm* — JCIPRNET

(57) ABSTRACT

An additive manufacturing apparatus includes a build table on which a material layer is formed by supply of material powder, and an irradiator that irradiates the material layer with an energy beam and forms a solidified layer. A temperature adjuster includes a heater that heats the build table to a set temperature and a first cooler that cools the build table. A refrigerant circulation device adjusts a temperature of a refrigerant and circulates the refrigerant between itself and a first cooler. A control device is configured to control a supply refrigerant temperature being the temperature of the refrigerant supplied from the refrigerant circulation device based on the set temperature.

6 Claims, 12 Drawing Sheets

(51) Int. Cl.

| | |
|---|---|
| ***B22F 10/30*** | (2021.01) |
| ***B22F 12/30*** | (2021.01) |
| ***B22F 12/90*** | (2021.01) |
| ***B33Y 10/00*** | (2015.01) |
| ***B33Y 30/00*** | (2015.01) |
| ***B33Y 50/02*** | (2015.01) |

(52) U.S. Cl.

CPC .............. *B22F 12/90* (2021.01); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 2016/0096326 | A1* | 4/2016 | Naware | B29C 64/106 425/143 |
| 2018/0200790 | A1* | 7/2018 | Hart | B22F 10/28 |
| 2018/0290210 | A1 | 10/2018 | Okazaki et al. | |
| 2019/0061001 | A1 | 2/2019 | Araie et al. | |
| 2019/0247923 | A1* | 8/2019 | Lu | F25B 21/04 |
| 2020/0061922 | A1* | 2/2020 | Meiners | B29C 64/232 |
| 2020/0230880 | A1* | 7/2020 | Okazaki | B29C 64/153 |
| 2020/0324484 | A1* | 10/2020 | Simpson | B29C 64/245 |
| 2021/0114096 | A1 | 4/2021 | Nakamura et al. | |
| 2021/0156890 | A1* | 5/2021 | Kobayashi | G01R 1/0408 |
| 2022/0072619 | A1 | 3/2022 | Hirono et al. | |

FOREIGN PATENT DOCUMENTS

| | | |
|---|---|---|
| JP | 2008307895 | 12/2008 |
| JP | 4258571 | 4/2009 |
| JP | 5685782 | 3/2015 |
| JP | 6295001 | 3/2018 |
| JP | 6340452 | 6/2018 |
| JP | 2021066906 | 4/2021 |
| JP | 2021115625 | 8/2021 |
| TW | 202116443 | 5/2021 |
| WO | 2008143106 | 11/2008 |
| WO | 2020188881 | 9/2020 |

OTHER PUBLICATIONS

Espacenet machine translation of Komano et al., JP 2005315488 A (originally published 2005) (Year: 2005).*

Merged Yamamoto, JP 2005007736 A, and corresponding English translation (Year: 2005).*

* cited by examiner

ADDITIVE MANUFACTURING APPARATUS AND METHOD OF ADDITIVE MANUFACTURING AN OBJECT

CROSS-REFERENCE TO RELATED APPLICATION

This application claims the priority benefit of Japanese patent application serial No. 2022-044050, filed on Mar. 18, 2022. The entirety of the above-mentioned patent application is here by incorporated by reference herein and made a part of this specification.

BACKGROUND

The disclosure relates to an additive manufacturing apparatus and a method of additive manufacturing a three-dimensional object.

Various methods are known in additive manufacturing of three-dimensional objects. For example, in a chamber filled with an inert gas, metal material powder is supplied into a build area on a build table, and a material layer is formed. By irradiating an energy beam such as a laser beam or an electron beam onto a predetermined position in the material layer by an irradiator, the material layer is sintered or melted, and a solidified layer is formed. By repeatedly forming such a material layer and such a solidified layer, the solidified layers are stacked, and a desired three-dimensional object is produced.

The material layer is preferably preheated to a predetermined temperature in preparation for irradiation with the energy beam. A build table on which the material layer is laid is configured to be heated by a heater. By transferring heat from the build table that has been heated to a set temperature equivalent to a desired preheat temperature, the material layer is preheated. The set temperature during heating of the build table is generally about 120° C. However, if heat-resistant steel or the like is used as a material, the build table may be heated to a relatively high set temperature of about 140° C. to 200° C. according to the preheat temperature suitable for the material. Japanese Patent No. 6340452 discloses a build table which is able to heat a material layer to a high temperature.

After irradiation with the energy beam, an irradiated portion undergoes a sharp temperature drop and the solidified layer is formed. The solidified layer may be cooled after completion or in the middle of manufacturing of the object in order to improve manufacturing accuracy or the like. For example, the build table is cooled by a cooler, thereby cooling the solidified layer on the build table to a predetermined temperature. Japanese Patent No. 6295001 discloses an additive manufacturing method in which, by cooling a solidified layer to a predetermined temperature in the middle of manufacturing and intentionally causing a martensite transformation, stress of the solidified layer is relaxed.

The cooling of the build table is performed by, for example, introducing a refrigerant circulation device such as a chiller and circulating a temperature-adjusted refrigerant between the refrigerant circulation device and a cooler of the build table. If a refrigerant circulation device is introduced having cooling capacity corresponding to a general set temperature during heating of the build table, the cooling capacity may be insufficient when the set temperature is relatively high. As a result, it may take long to cool the build table and it may be difficult to cool the build table to a desired cooling temperature. On the other hand, if a refrigerant circulation device having relatively high cooling capacity is introduced or the number of refrigerant circulation devices is increased in order to be able to cope with manufacturing in which the set temperature of the build table is relatively high, the introduction cost of apparatuses may be increased, and the size of the entire refrigerant circulation device may be increased.

The present invention provides an additive manufacturing apparatus including a refrigerant circulation device that circulates a refrigerant for cooling a build table, in which efficient cooling is possible even if the set temperature during heating of the build table is relatively high, and an increase in introduction cost and an increase in size of the refrigerant circulation device may be avoided.

SUMMARY

In one aspect, the present disclosure provides an additive manufacturing apparatus including: a build table, on which a material layer is formed by supply of material powder; and an irradiator, irradiating the material layer with an energy beam and forming a solidified layer. The additive manufacturing apparatus further includes: a temperature adjuster, including a heater that heats the build table to a set temperature and a first cooler that cools the build table; a refrigerant circulation device, adjusting a temperature of a refrigerant and circulates the refrigerant between the refrigerant circulation device and the first cooler; and a control device, configured to control a supply refrigerant temperature being the temperature of the refrigerant supplied from the refrigerant circulation device based on the set temperature.

The control device is configured to control the supply refrigerant temperature being the temperature of the refrigerant supplied from the refrigerant circulation device based on the set temperature during heating of the build table. By such a configuration, even if the refrigerant circulation device having cooling capacity corresponding to a general set temperature is introduced, in manufacturing with a relatively high set temperature, by adjusting the refrigerant to a relatively low temperature and then supplying the refrigerant to the cooler, it is possible to efficiently cool the build table without increasing the number of refrigerant circulation devices.

In another aspect, the present disclosure provides a method of additive manufacturing an object. The method includes processes of: supplying material powder onto a build table and forming a material layer; heating the build table to a predetermined set temperature; forming a solidified layer by irradiating the material layer with an energy beam; adjusting a supply refrigerant temperature based on the set temperature, in which the supply refrigerant temperature is a temperature of a refrigerant supplied from a refrigerant circulation device; and circulating the refrigerant between the refrigerant circulation device and a cooler that cools the build table.

DESCRIPTION OF THE EMBODIMENTS

Hereinafter, embodiments of the present invention will be described with reference to the drawings. Various characteristics described in the embodiments below can be combined with each other. The invention is independently established for each characteristic.

1. Additive Manufacturing Apparatus 100

Figure 1:
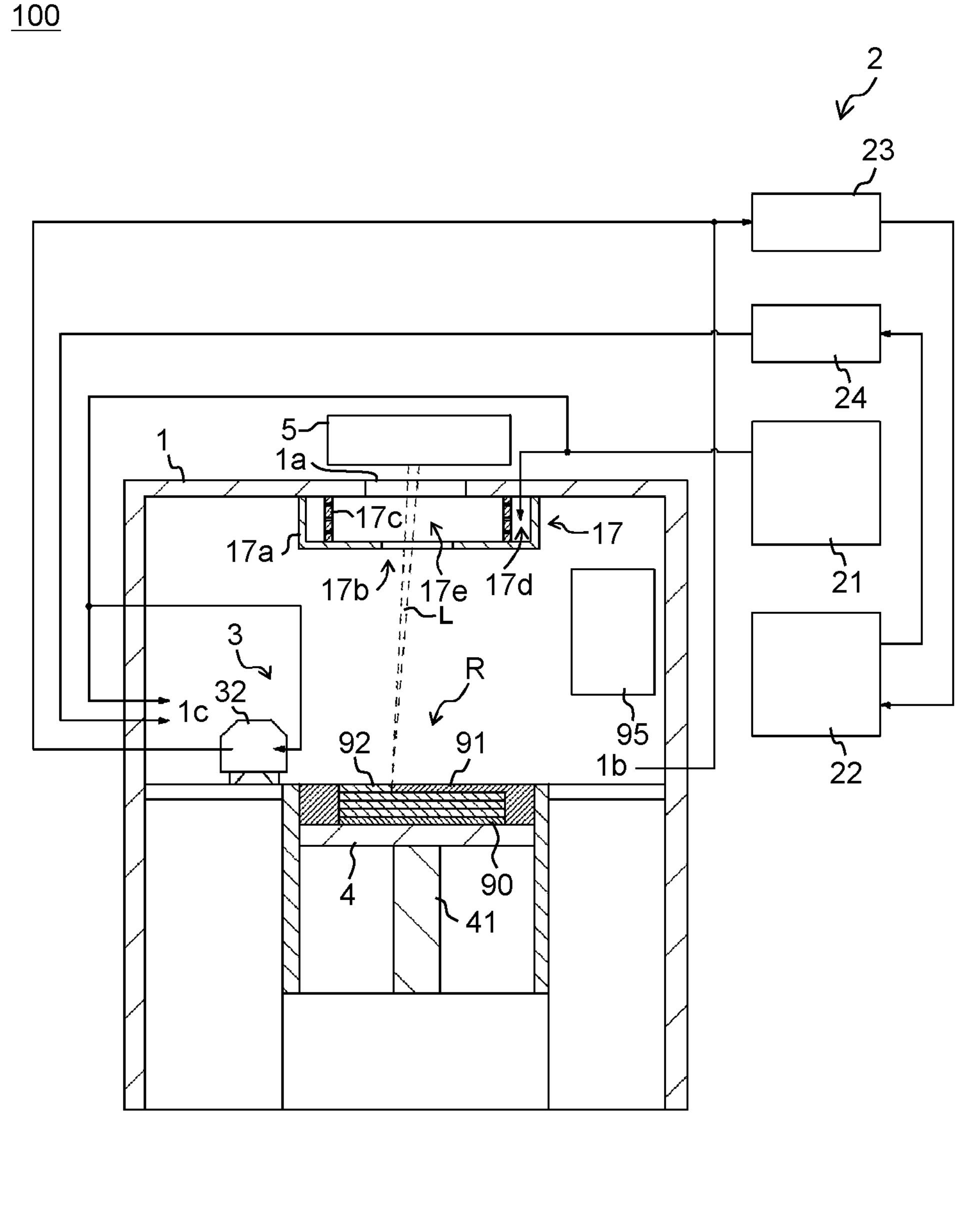
FIG. 1 is a schematic configuration diagram of an additive manufacturing apparatus 100 according to an embodiment of the present invention.

As illustrated in FIG. 1, an additive manufacturing apparatus 100 includes a chamber 1, a material layer forming device 3, a build table 4, and an irradiator 5. The additive manufacturing apparatus 100 further includes a control device 8 to be described later. By repeatedly forming a material layer 91 and a solidified layer 92 in a build area R provided on the build table 4, a desired object is built.

1.1. Chamber 1

The chamber 1 covers the build area R being an area where an object is built. The chamber 1 is connected to a gas circulator 2.

The gas circulator 2 includes a gas supply device 21, a fume collector 22, and duct boxes 23 and 24. The inside of the chamber 1 is filled with an inert gas of a predetermined concentration supplied from the gas supply device 21. In this specification, the inert gas is a gas that does not substantially react with the material layer 91 or the solidified layer 92, and is selected according to the type of material. For example, nitrogen gas, argon gas or helium gas may be used as the inert gas. The gas supply device 21 is, for example, a gas cylinder.

As illustrated in FIG. 1, the inert gas containing a fume generated during formation of the solidified layer 92 is discharged from a discharge port 1*b* of the chamber 1 and sent to the fume collector 22 via the duct box 23. The inert gas that has the fume removed therefrom in the fume collector 22 is supplied from a supply port 1*c* of the chamber 1 via the duct box 24 and is to be reused.

A suction fan (not illustrated) and a fan cooler (not illustrated) are provided in the middle of a duct connecting the discharge port 1*b* for the inert gas from the chamber 1 and the duct box 23. By the suction fan, the inert gas in the chamber 1 is forcibly discharged. The fan cooler is a tubular member configured to allow a refrigerant supplied from a refrigerant circulation device 6 to circulate therethrough, cooling the suction fan and its peripheral parts during operation of the gas circulator 2 and preventing malfunction or damage.

A window 1*a* serving as a transmission window for a laser beam L is provided on an upper surface of the chamber 1. The window 1*a* is formed of a material capable of transmitting the laser beam L.

A contamination prevention device 17 is provided on the upper surface of the chamber 1 so as to cover the window 1*a*. The contamination prevention device 17 includes a housing 17*a* of a cylindrical shape, and a diffusing member 17*c* of a cylindrical shape disposed inside the housing 17*a*. A gas supplying space 17*d* is provided between the housing 17*a* and the diffusing member 17*c*. An opening part 17*b* is provided on a bottom surface of the housing 17*a* inside the diffusing member 17*c*. A large number of pores are provided in the diffusing member 17*c*. A clean inert gas supplied from the gas supply device 21 to the gas supplying space 17*d* fills a clean room 17*e* through the pores, and is ejected from the opening part 17*b* toward below the contamination prevention device 17.

1.2. Material Layer Forming Device 3

Figure 2:
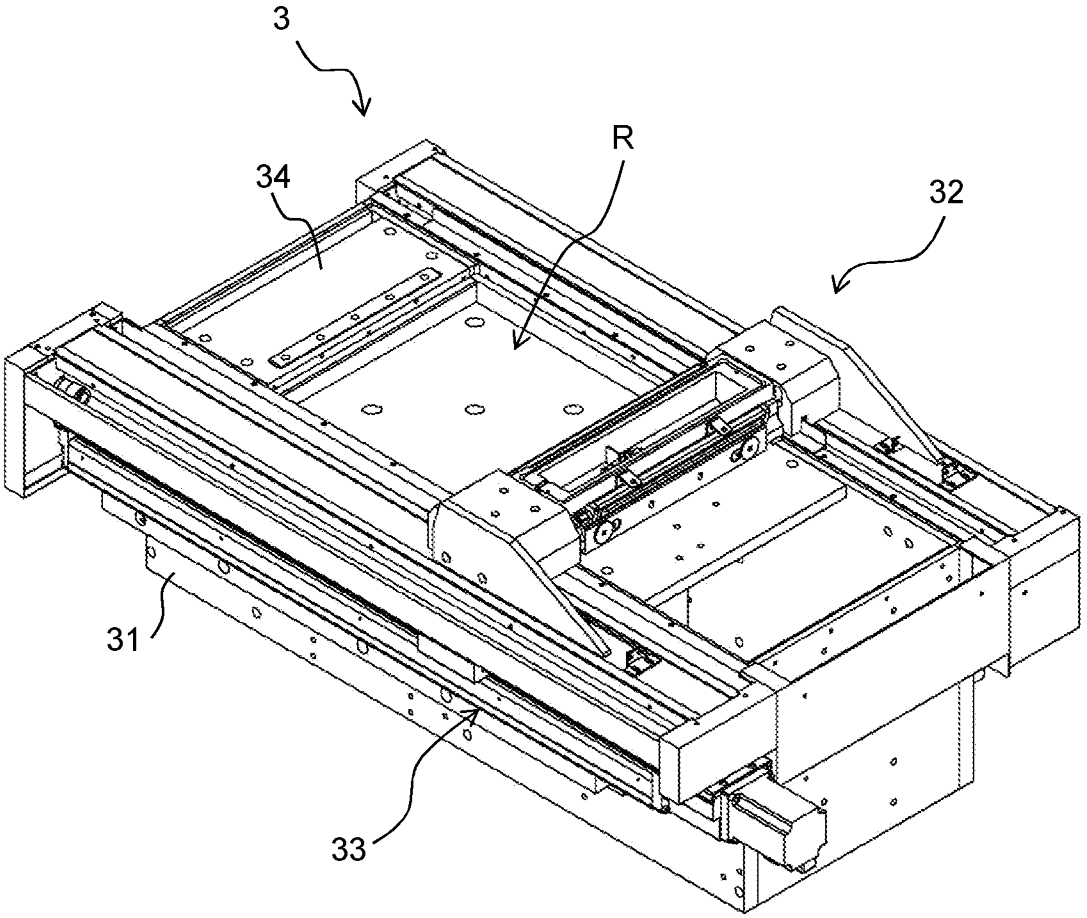
FIG. 2 is a perspective view of a material layer forming device 3.

The material layer forming device 3 is provided inside the chamber 1. As illustrated in FIG. 2, the material layer forming device 3 includes a base 31, and a recoater head 32 disposed on the base 31. The recoater head 32 is configured to be horizontally reciprocable by a recoater head drive device 33 having a drive mechanism such as a motor built therein.

Figure 3:
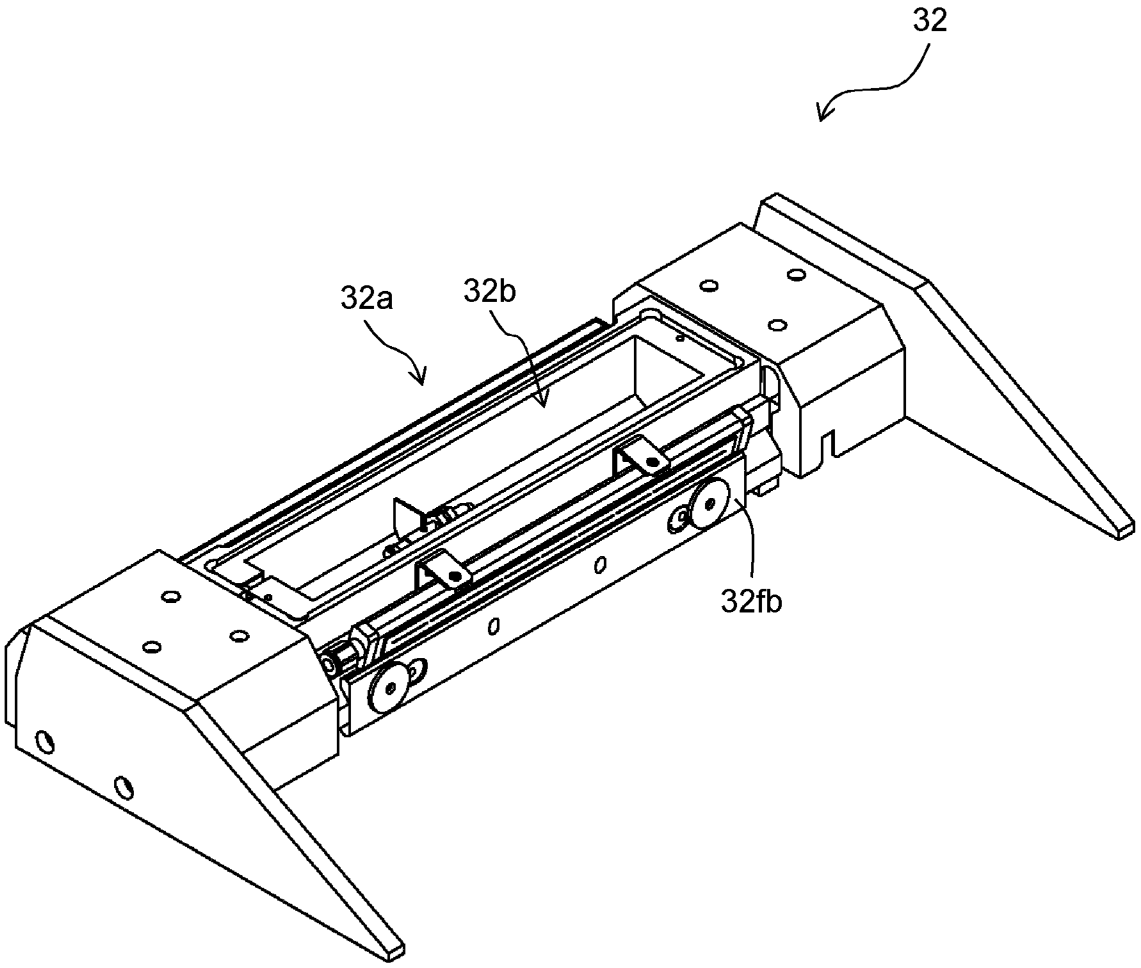
FIG. 3 is a perspective view from above of a recoater head 32 of the material layer forming device 3.
Figure 4:
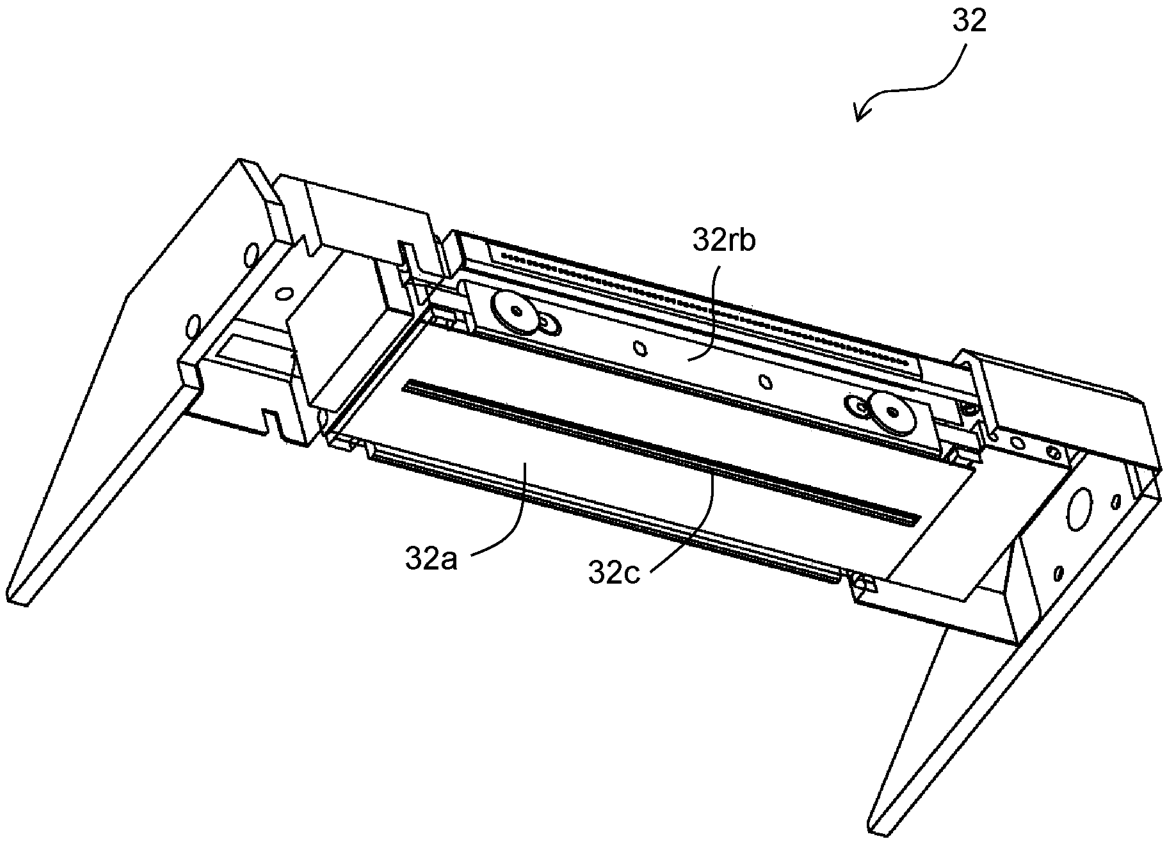
FIG. 4 is a perspective view from below of the recoater head 32 of the material layer forming device 3.

As illustrated in FIG. 3 and FIG. 4, the recoater head 32 includes a material container 32*a*, a material supply port 32*b*, and a material discharge port 32*c*. The material supply port 32*b* is provided on an upper surface of the material container 32*a* and serves as a receiving port for material powder supplied from a material supply unit (not illustrated) to the material container 32*a*. The material discharge port 32*c* is provided on a bottom surface of the material container 32*a* and discharges the material powder in the material container 32*a*. The material discharge port 32*c* has a slit shape extending in a longitudinal direction of the material container 32*a*. Blades 32*fb* and 32*rb* of a flat plate shape are provided respectively on both side surfaces of the recoater head 32. The blades 32*fb* and 32*rb* flatten the material powder discharged from the material discharge port 32*c* to form the material layer 91.

1.3. Build Table 4

As illustrated in FIG. 1, the build table 4 is disposed in the chamber 1, and a three-dimensional object is built in the build area R located on the build table 4. The build table 4 is driven by a build table drive device 41 and is vertically movable. As illustrated in FIG. 2, a frame 34 is provided above the build table 4, and the build area R is provided inside the frame 34. A base plate 90 is disposed in the build area R, the material powder is supplied onto an upper surface of the base plate 90, and the material layer 91 is formed.

Figure 5:
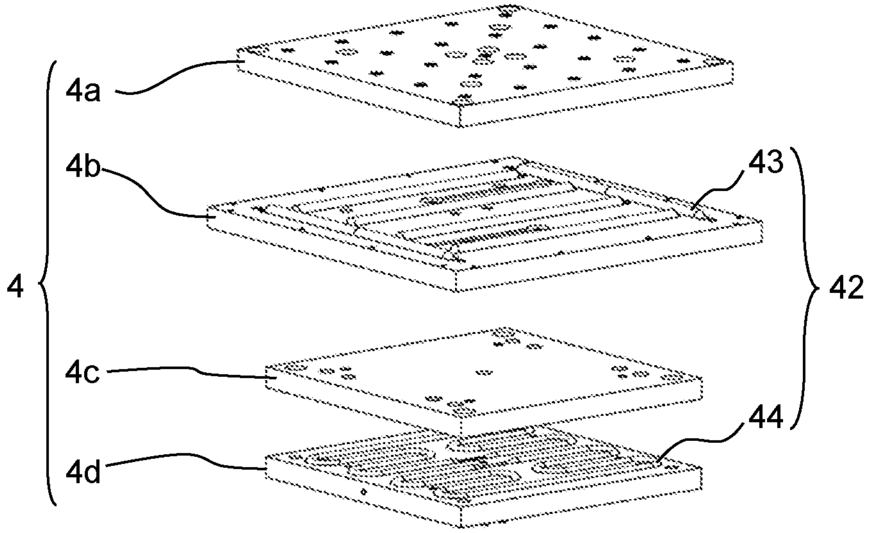
FIG. 5 is an exploded perspective view of a build table 4 including a temperature adjuster 42.

The additive manufacturing apparatus 100 includes a temperature adjuster 42 for adjusting a temperature of the material layer 91 and the solidified layer 92. As illustrated in FIG. 5, the temperature adjuster 42 includes a heater 43 that heats the build table 4 to a predetermined set temperature T1 and a first cooler 44 that cools the build table 4 to a predetermined cooling temperature T2. By heating the build table 4 by the heater 43 or cooling the build table 4 by the first cooler 44, the temperature of the material layer 91 and the solidified layer 92 on the build table 4 is adjusted.

The temperature adjuster 42 is provided inside the build table 4. The build table 4 includes a top plate 4*a* and three support plates 4*b*, 4*c*, and 4*d*. The heater 43 that is able to heat the top plate 4*a* is disposed between the top plate 4*a* and the support plate 4*b* disposed directly there below. The first cooler 44 that is able to cool the top plate 4*a* is disposed between the two support plates 4*c* and 4*d* below the support plate 4*b*.

The heater 43 is, for example, an electric heater including a heating element, or a tubular member configured to allow a high-temperature heat medium to circulate therethrough. The first cooler 44 is a tubular member configured to allow the refrigerant supplied from the refrigerant circulation device 6 to circulate therethrough. The heater 43 and the first cooler 44 constitute the temperature adjuster 42, and the top plate 4*a* as the top surface of the build table 4 can be heated or cooled by the temperature adjuster 42. The material layer 91 and the solidified layer 92 are subjected to temperature adjustment by direct heat transfer to and from the top plate 4*a*, or by indirect heat transfer via the base plate 90 disposed on the top plate 4*a* and a layer formed below the material layer 91 or the solidified layer 92 to be heated or cooled.

A configuration of the temperature adjuster 42 is not limited to the configuration of the above embodiment. As illustrated in FIG. 5, the tubular member of the first cooler 44 is disposed so as to be sandwiched between the support plates 4*c* and 4*d*. However, for example, a pipeline for circulating a refrigerant may be formed inside one or both of the support plates 4*c* and 4*d*, and the pipeline may constitute the first cooler 44. The top plate 4*a* and the three support plates 4*b*, 4*c*, and 4*d* may form an integral structure, and the heater 43 and the first cooler 44 may be configured in the structure. In order to prevent thermal displacement of the build table drive device 41, a constant temperature part maintained at a constant temperature may be provided between the temperature adjuster 42 and the build table drive device 41.

The additive manufacturing apparatus 100 is provided with a thermal insulation block (not illustrated) for preventing heat transfer from the build table 4 to the frame 34 and the recoater head drive device 33, and a thermal insulation block cooler (not illustrated). Accordingly, it is possible to prevent thermal deformation of the frame 34 or malfunction of the recoater head drive device 33 due to heating of the build table 4. The thermal insulation block cooler is a tubular member configured to allow the refrigerant supplied from the refrigerant circulation device 6 to circulate therethrough, and cools the thermal insulation block.

1.4. Irradiator 5

Figure 6:
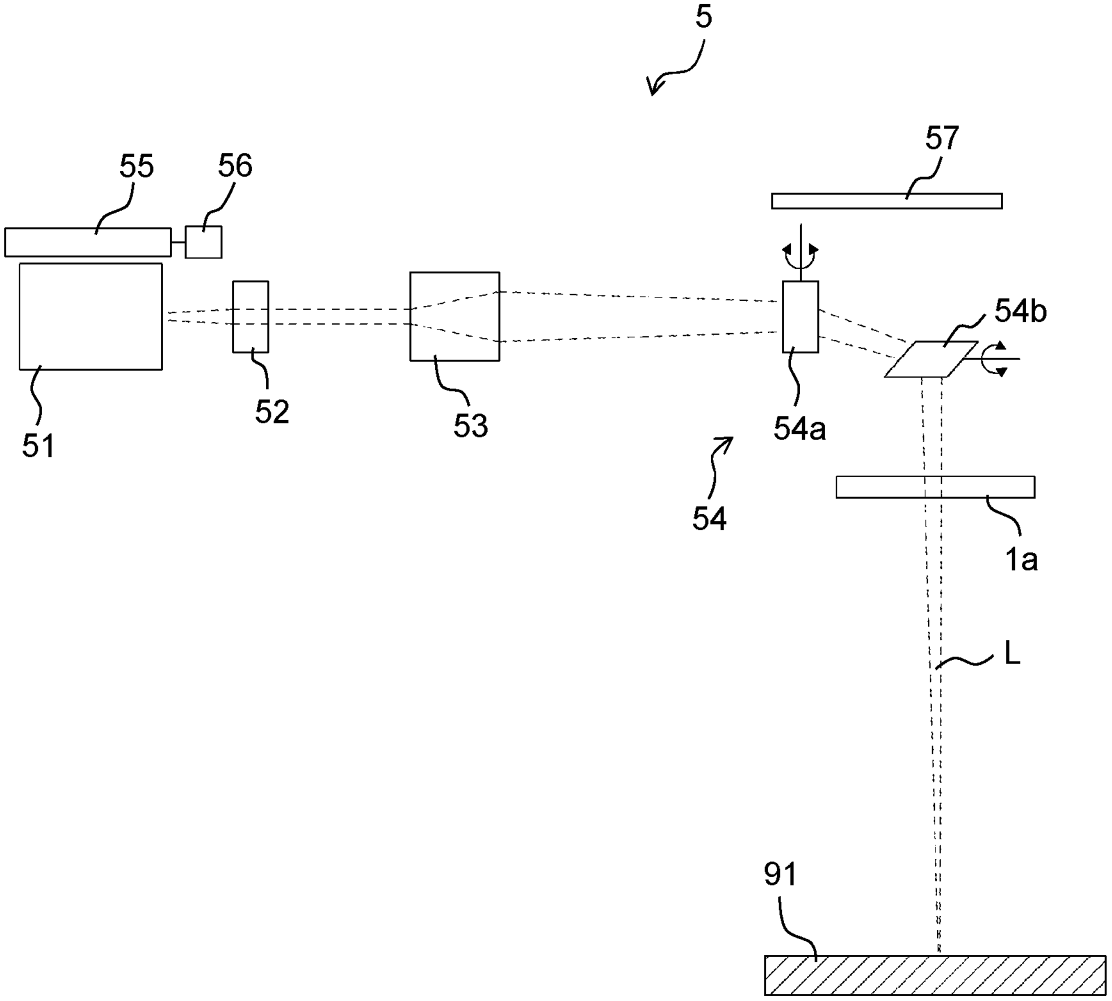
FIG. 6 is a schematic configuration diagram of an irradiator 5.

As illustrated in FIG. 1, the irradiator 5 irradiates the material layer 91 with the laser beam L or an electron beam and forms the solidified layer 92. The irradiator 5 is provided above the chamber 1, irradiates an irradiation area of the material layer 91 formed in the build area R with the laser beam L, melts or sinters and solidifies the material powder to form the solidified layer 92. As illustrated in FIG. 6, the irradiator 5 includes a laser oscillator 51, a collimator 52, a focus control unit 53, and a scanner 54.

The laser oscillator 51 has a laser element built therein serving as a light source, and outputs the laser beam L. A fiber laser may be used as the laser beam L. It suffices if the laser beam L is able to sinter or melt the material powder, and the laser beam L may be a $CO_2$ laser or a yttrium aluminum garnet (YAG) laser.

The additive manufacturing apparatus 100 includes a second cooler 55 that cools the laser oscillator 51. The second cooler 55 is a tubular member provided inside the irradiator 5 and configured to allow the refrigerant supplied from the refrigerant circulation device 6 to circulate therethrough. By cooling the laser oscillator 51 by the second cooler 55, the laser oscillator 51 can be prevented from malfunctioning or being damaged due to heat generated from the laser element.

The additive manufacturing apparatus 100 includes a temperature monitor 56 that monitors a temperature of the refrigerant supplied to the second cooler 55. If the temperature of the refrigerant supplied to the second cooler 55 deviates from a predetermined allowable range and a cooling failure occurs in the laser oscillator 51, there is a possibility of causing an abnormality in manufacturing. When the temperature of the refrigerant deviates from the allowable range, the temperature monitor 56 detects the abnormality and outputs an alarm signal to the control device 8. The temperature monitor 56 is, for example, a temperature sensor. The temperature monitor 56 is provided near a refrigerant inlet of the second cooler 55, and outputs the alarm signal to the control device 8 when the temperature of the refrigerant is outside a range of 16° C. to 35° C.

The collimator 52 includes a collimator lens (not illustrated), and converts the laser beam L output from the laser oscillator 51 into parallel light. The focus control unit 53 includes a focus control lens (not illustrated), and a motor (not illustrated) that moves the focus control lens back and forth along an optical axis direction. The focus control unit 53 adjusts a focal position of the laser beam L converted into parallel light by the collimator 52, thereby adjusting a beam diameter of the laser beam L on a surface of the material layer 91.

The scanner 54 scans the laser beam L over an upper surface of the material layer 91. The scanner 54 is a galvanometer scanner, and includes a first galvanometer mirror 54*a*, a second galvanometer mirror 54*b*, and a first actuator and a second actuator (both not illustrated) that respectively rotate the first galvanometer mirror 54*a* and the second galvanometer mirror 54*b* to a desired angle. The laser beam L that has passed through the focus control unit 53 is two-dimensionally scanned over the upper surface of the material layer 91 within the build area R by the first galvanometer mirror 54*a* and the second galvanometer mirror 54*b*. The laser beam L is reflected by the first galvanometer mirror 54*a* in a horizontal X-axis direction in the build area R, and is reflected by the second galvanometer mirror 54*b* and scanned in a horizontal Y-axis direction orthogonal to the X-axis in the build area R. The laser beam L reflected by the first galvanometer mirror 54*a* and the second galvanometer mirror 54*b* is transmitted through the window 1*a* and irradiated onto the material layer 91 within the build area R. Accordingly, the solidified layer 92 is formed.

A scanner cooler 57 for cooling the above components is provided inside the scanner 54. The scanner cooler 57 is a tubular member configured to allow the refrigerant supplied from the refrigerant circulation device 6 to circulate therethrough, cooling a component of the scanner 54 that is heated due to scanning of the laser beam L and preventing malfunction or damage.

The irradiator 5 is not limited to the above-described form. For example, an fθ lens may be provided in place of the focus control unit 53. The irradiator 5 may be configured to irradiate an electron beam instead of the laser beam L to solidify the material layer 91. The irradiator 5 may be configured to include a cathode electrode emitting electrons, an anode electrode converging and accelerating electrons, a solenoid forming a magnetic field and converging directions of the electron beam into one direction, and a collector electrode electrically connected to the material layer 91 as an irradiated body and applying a voltage between itself and the cathode electrode.

2. Refrigerant Circulation Device 6

Figure 7:
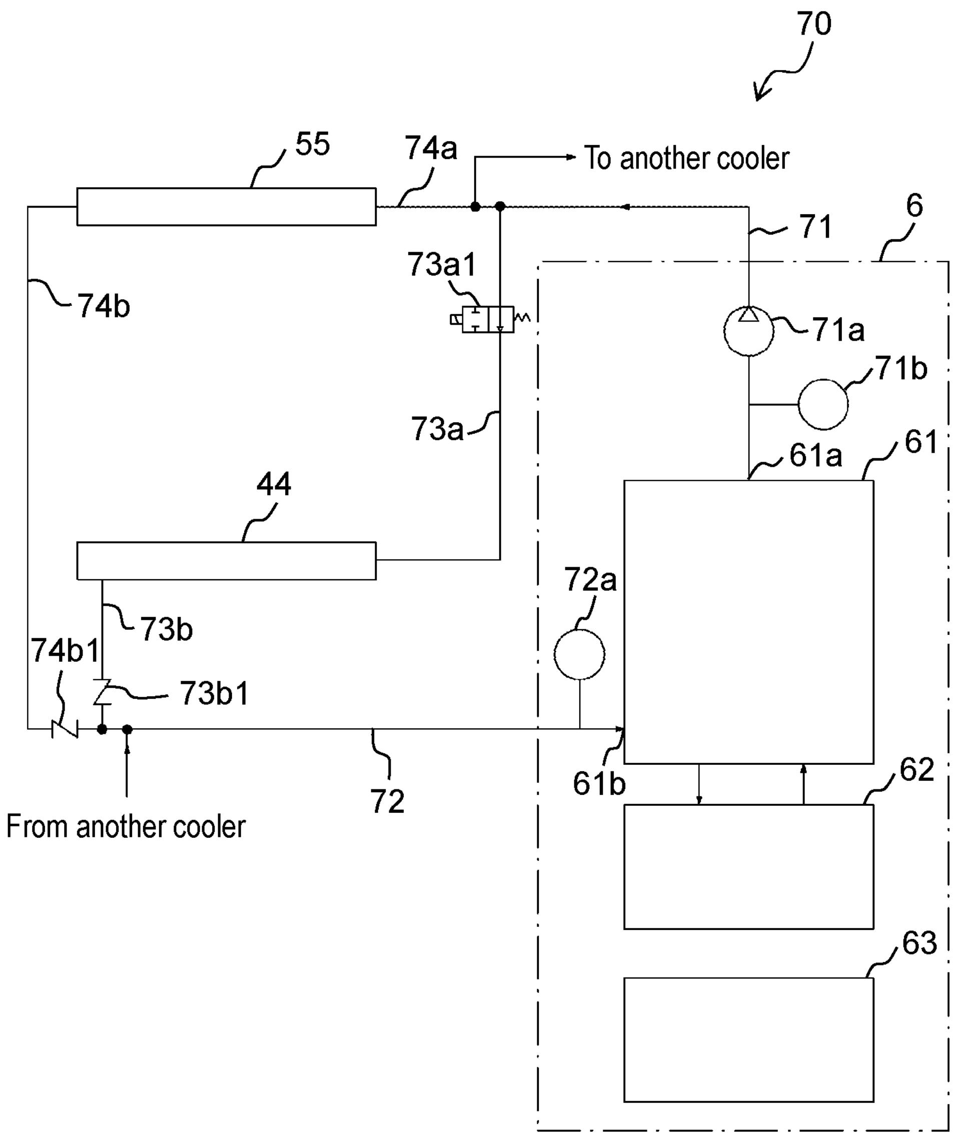
FIG. 7 is a schematic configuration diagram of a refrigerant circulation system including a refrigerant circulation device 6.

The additive manufacturing apparatus 100 includes the refrigerant circulation device 6. As illustrated in FIG. 7, the refrigerant circulation device 6 adjusts the temperature of the refrigerant and circulates the refrigerant between itself and the first cooler 44.

The refrigerant circulation device 6 is a chiller that adjusts the temperature of cooling water as the refrigerant and circulates the same. The refrigerant circulation device 6 includes a cooling water tank 61, a heat exchanger 62 and a refrigerant circulation controller 63. The refrigerant circulation device 6 circulates the cooling water between itself and, in addition to the first cooler 44, the second cooler 55, the scanner cooler 57, the fan cooler and the thermal insulation block cooler. The targets to and from which the cooling water is circulated in the present embodiment are presented as examples and are not intended to be limiting. As the refrigerant circulation device 6, a device such as a cooling tower may be used in place of the chiller.

The cooling water stored inside the cooling water tank 61 has its temperature adjusted by being cooled by the heat exchanger 62, and the cooling water circulates through a circulation path 70. The circulation path 70 includes a main supply path 71, a main return path 72, as well as branch supply paths 73*a*, 74*a*, and so forth, and branch return paths 73*b*, 74*b*, and so forth, provided for each cooler to which the cooling water is supplied. The coolers include the first cooler 44, the second cooler 55, the scanner cooler 57, the fan cooler and the thermal insulation block cooler.

The main supply path 71 is a pipeline for supplying the cooling water from the refrigerant circulation device 6 to each cooler, and connects a cooling water outlet 61*a* of the cooling water tank 61 with an upstream side of each of the branch supply paths 73*a*, 74*a*, and so forth. The main supply path 71 is provided with a pump 71*a*. The cooling water whose temperature has been adjusted by the heat exchanger 62 is discharged from the cooling water tank 61 to the main supply path 71 by the pump 71*a*. In order to detect the temperature of the cooling water supplied from the cooling water tank 61, in the main supply path 71, an outlet temperature sensor 71*b* is provided near the cooling water outlet 61*a*. The outlet temperature sensor 71*b* outputs a detection signal to the control device 8.

The main return path 72 is a pipeline for returning the cooling water that has passed through each cooler to the refrigerant circulation device 6, and connects a cooling water inlet 61*b* of the cooling water tank 61 with a downstream side of each of the branch return paths 73*b*, 74*b*, and so forth. In order to detect the temperature of the cooling water returned to the cooling water tank 61, in the main return path 72, an inlet temperature sensor 72*a* is provided near the cooling water inlet 61*b*. The inlet temperature sensor 72*a* outputs a detection signal to the control device 8.

The main supply path 71 branches into a plurality of branch supply paths 73*a*, 74*a*, and so forth on the downstream side. A plurality of branch return paths 73*b*, 74*b*, and so forth join together on the upstream side of the main return path 72. Regarding the configuration of the branch supply paths 73*a*, 74*a*, and so forth and the branch return paths 73*b*, 74*b*, and so forth, the first branch supply path 73*a* and the first branch return path 73*b* provided for the first cooler 44 as well as the second branch supply path 74*a* and the second branch return path 74*b* provided for the second cooler 55 will be described in detail as an example.

The first branch supply path 73*a* connects the downstream side of the main supply path 71 with the first cooler 44 of the temperature adjuster 42. The main supply path 71 and the first branch supply path 73*a* constitute a refrigerant supply path for supplying the cooling water to the first cooler 44. The first branch supply path 73*a* is provided with an electromagnetic valve 73*a*1 as a refrigerant supply valve. By opening the electromagnetic valve 73*a*1, the cooling water can be supplied to the first cooler 44; by closing the electromagnetic valve 73*a*1, the supply of cooling water to the first cooler 44 can be stopped. The first branch return path 73*b* connects the first cooler 44 with the upstream side of the main return path 72. The first branch return path 73*b* is provided with a check valve 73*b*1. The cooling water that has passed through the first cooler 44 is returned to the refrigerant circulation device 6 via the first branch return path 73*b* and the main return path 72.

The second branch supply path 74*a* connects the downstream side of the main supply path 71 and the second cooler 55 of the laser oscillator 51. The second branch return path 74*b* connects the second cooler 55 with the upstream side of the main return path 72. The second branch return path 74*b* is provided with a check valve 74*b*1. The cooling water that has passed through the second cooler 55 is returned to the refrigerant circulation device 6 via the second branch return path 74*b* and the main return path 72.

The refrigerant circulation device 6 has a low load mode and a high load mode as an operation mode. The refrigerant circulation device 6 adjusts the temperature of the cooling water with relatively low cooling capacity in the low load mode, and adjusts the temperature of the cooling water with higher cooling capacity in the high load mode than in the low load mode. Details of each operation mode will be described later.

3. Control Device 8

Figure 8:
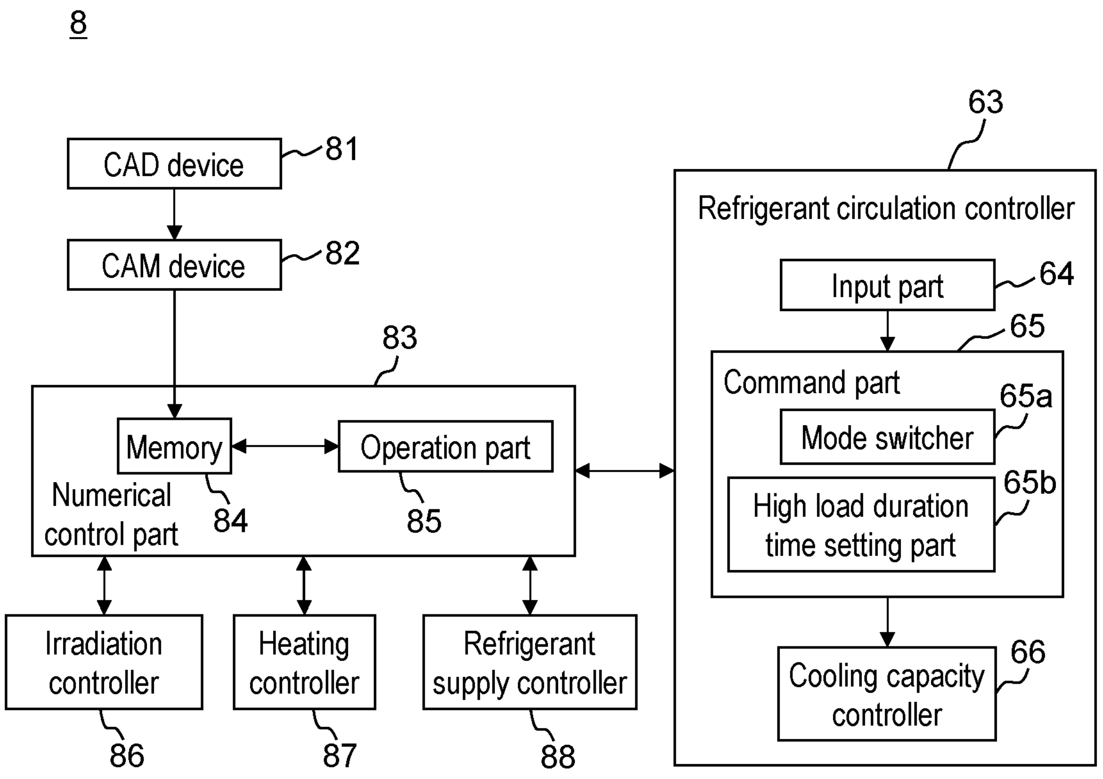
FIG. 8 is a block diagram illustrating a configuration of a control device 8.

Next, the control device 8 for controlling the additive manufacturing apparatus 100 will be described by limiting to a configuration related to the present invention. As illustrated in FIG. 8, the control device 8 includes a computer-aided design (CAD) device 81, a computer-aided manufacturing (CAM) device 82, a numerical control part 83, and controllers 86, 87, 88, and 63 of components of the additive manufacturing apparatus 100.

Each of the above components of the control device 8 may be realized by software or hardware. When realized by software, various functions can be realized by the CPU executing programs. The program may be stored in built-in memory or a non-transitory readable medium by a computer. Alternatively, the above functions are realized by reading the program stored in external memory using so-called cloud computing. When realized by hardware, the above functions can be performed by various circuits such as an application-specific integrated circuit (ASIC), a field-programmable gate array (FPGA), or a dynamically reconfigurable processor (DRP). The embodiment deals with various information and concepts including this information, and the various information is a bit group of binary numbers having 0 or 1, and the various information is represented according to the level of signal value. And in the embodiment, communications and calculations can be executed according to configurations of the above software and hardware.

The CAD device 81 is for creating three-dimensional shape data (CAD data) indicating the shape and dimensions of an object. The CAM device 82 is for creating operation procedure data (CAM data) of a component of the additive manufacturing apparatus 100 based on the CAD data. The CAM data contains, for example, a preheat temperature suitable for the material powder constituting the material layer 91, or data of an irradiation position or irradiation condition of the laser beam L in each material layer 91. The CAM data is output to the numerical control part 83. The CAM data may be output to a non-transitory recording medium such as a flash memory and taken into the numerical control part 83 via the recording medium. Alternatively, it is also possible to connect a CAM computer and the numerical control part 83 via a network and output the CAM data to the numerical control part 83.

The numerical control part 83 creates an operation command for a component of the additive manufacturing apparatus 100. The numerical control part 83 includes a memory 84 and an operation part 85. The operation part 85 performs processing using a numerical control program generated based on the CAM data stored in the memory 84, and outputs the operation command in the form of a signal or data of an operation command value to the controllers 86, 87, 88, and 63 of the components of the additive manufacturing apparatus 100. The memory 84 stores the CAM data, the numerical control program, and the like.

The irradiation controller 86 controls an operation of the irradiator 5 based on the operation command. The irradiation controller 86 controls the laser oscillator 51, the focus control unit 53 and the scanner 54. Accordingly, the laser beam L is irradiated onto the material layer 91 at a predetermined laser power, a predetermined beam system, a predetermined irradiation timing, and a predetermined irradiation position. The irradiation controller 86 feeds back actual operation information of the irradiator 5 to the numerical control part 83. When the temperature monitor 56 of the second cooler 55 outputs an alarm signal, the operation part 85 of the numerical control part 83 that has received the alarm signal outputs an operation command to the irradiation controller 86 for stopping irradiation. Accordingly, the manufacturing is interrupted, and abnormal manufacturing due to a cooling failure in the laser oscillator 51 can be prevented beforehand.

The heating controller 87 controls an operation of the heater 43 of the temperature adjuster 42 based on the operation command. In the case where the heater 43 is an electric heater, the heating controller 87 controls the output of the electric heater. Alternatively, in the case where the heater 43 is a tubular member allowing a heat medium to circulate therethrough, the heating controller 87 controls the supply of the heat medium to the heater 43. By controlling the heater 43 in this way, the build table 4 can be heated to the set temperature T1 corresponding to the preheat temperature of the material layer 91. The heating controller 87 feeds back actual operation information of the heater 43 to the numerical control part 83. A temperature sensor (not illustrated) is provided for detecting an actual temperature T3 of the build table 4. The heating controller 87 feeds back information on the actual temperature T3 to the numerical control part 83.

The refrigerant supply controller 88 controls an operation of the first cooler 44 of the temperature adjuster 42 based on the operation command. The refrigerant supply controller 88 controls the supply of cooling water to the first cooler 44 by opening and closing the electromagnetic valve **73*a*1 provided in the first branch supply path 73*a*. Furthermore, the refrigerant supply controller 88 feeds back actual operation information of the electromagnetic valve 73*a*1 to the numerical control part 83**.

Here, the control by the heating controller 87 and the refrigerant supply controller 88 is preferably performed so that heating of the build table 4 by the heater 43 and cooling of the build table 4 by the first cooler 44 are not performed at the same time. That is, in a state in which the heater 43 is heating the build table 4, the electromagnetic valve **73*a*1 is closed and the supply of cooling water to the first cooler 44 is stopped. At the same time as or after the heating of the build table 4 by the heater 43 is stopped, the electromagnetic valve 73*a*1 is opened and the cooling water is supplied to the first cooler 44. After cooling of the build table 4 is completed, at the same time as or after the electromagnetic valve 73*a*1 is closed and the supply of cooling water to the first cooler 44 is stopped, the heating of the build table 4 by the heater 43 is resumed. Accordingly, heating and cooling of the build table 4** can be efficiently performed.

The refrigerant circulation controller 63 is configured to control an operation of the refrigerant circulation device 6 based on the operation command, and, based on the set temperature T1, control a supply refrigerant temperature Tr being a temperature of the refrigerant supplied from the refrigerant circulation device 6. The refrigerant circulation controller 63 is configured to control the supply refrigerant temperature Tr by manipulating the cooling capacity of the refrigerant circulation device 6 based on the set temperature T1. As illustrated in FIG. 8, the refrigerant circulation controller 63 includes an input part 64, a command part 65, and a cooling capacity controller 66.

The input part 64 is for an operator to input information necessary for determining an operating condition of the refrigerant circulation device 6, and is composed of, for example, a touch panel, a keyboard, or a mouse. The input information contains, for example, operating conditions in the low load mode and operating conditions in the high load mode. The input information is sent to the command part 65.

Based on the operation command sent from the numerical control part 83 and the input information sent from the input part 64, the command part 65 determines a specific operating condition of the refrigerant circulation device 6. The command part 65 includes a mode switcher **65*a* and a high load duration time setting part 65*b***.

The mode switcher **65*a* switches the operation mode based on the set temperature T1 of the build table 4 and a high load duration time t1 to be described later. The mode switcher 65*a* outputs information on the operation mode to the cooling capacity controller 66**.

The high load duration time setting part **65*b* sets the high load duration time t1 being a duration time per operation of the refrigerant circulation device 6 in the high load mode. The operator inputs to the input part 64 the high load duration time t1 as an operating condition in the high load mode, and the input high load duration time t1 can be used as it is. The high load duration time t1** is set in consideration of the set temperature T1 and the cooling temperature T2 of the build table 4, the allowable range of the temperature of the cooling water supplied to the second cooler 55, or the like. The set high load duration time t1 is output to the cooling capacity controller 66. The setting of the high load duration time t1 is not limited to the above example. For example, a database recording the optimum high load duration time t1 according to a manufacturing condition or a function for calculating the high load duration time t1 from a manufacturing condition may be created in advance, and the high load duration time setting part 65*b* may be configured to set the high load duration time t1 using the database or the function.

The cooling capacity controller 66 manipulates the cooling capacity of the cooling water in the heat exchanger 62 based on the operating condition sent from the command part 65.

In the low load mode, the temperature of the cooling water passing through the main return path 72 toward the refrigerant circulation device 6 is controlled. Based on the detection signal sent from the outlet temperature sensor 71*b*, feedback control is performed in which the cooling capacity controller 66 manipulates the cooling capacity of the cooling water in the heat exchanger 62 according to a difference from a target refrigerant temperature input to the input part 64 as the operating condition in the low load mode. The target refrigerant temperature is set according to the cooling temperature T2 of the build table 4, the allowable range of the temperature of the cooling water supplied to the second cooler 55, or the like. The low load mode like this is a suitable operation mode in a state in which no cooling water is supplied to the first cooler 44 in the case where the set temperature T1 of the build table 4 is a general value of about 120° C. or lower, or where the set temperature T1 of the build table 4 is relatively high, for example, 140° C. or higher. The feedback control in the low load mode may also be performed based on the detection signal sent from the inlet temperature sensor 72*a*.

On the other hand, in the case where the set temperature T1 of the build table 4 is relatively high, when the cooling water is supplied to the first cooler 44 while the refrigerant circulation device 6 is operated in the low load mode, the temperature in the cooling water tank 61 is increased due to the cooling water returned from the first cooler 44, and there is a possibility that the cooling water may be supplied again to each cooler without being sufficiently cooled. As a result, there is a possibility that it may take a long time to cool the build table 4 to the desired cooling temperature T2 by the first cooler 44, or the temperature of the cooling water supplied to the second cooler 55 may deviate from the allowable range and the manufacturing may be stopped.

In the high load mode, in order to avoid the above situation, the temperature (supply refrigerant temperature Tr) of the cooling water supplied from the refrigerant circulation device 6 is feedforward controlled. Before the electromagnetic valve 73*a*1 is opened to start the supply of cooling water to the first cooler 44, with the electromagnetic valve 73*a*1 closed, the mode switcher 65*a* switches the refrigerant circulation device 6 from the low load mode to the high load mode. In the high load mode, the cooling capacity controller 66 controls the heat exchanger 62 so as to lower the temperature of the cooling water with the higher cooling capacity than in the low load mode.

The operator inputs to the input part 64 a set value of the cooling capacity in the high load mode as an operating condition in the high load mode. The set value is set in consideration of the set temperature T1 and the cooling temperature T2 of the build table 4, the allowable range of the temperature of the cooling water supplied to the second cooler 55, or the like. The set value is sent to the cooling capacity controller 66 via the command part 65, and the cooling capacity controller 66 manipulates the cooling capacity of the cooling water in the heat exchanger 62 based on the set value. As an example, the cooling capacity in the high load mode is set to 99% output.

Figure 9:
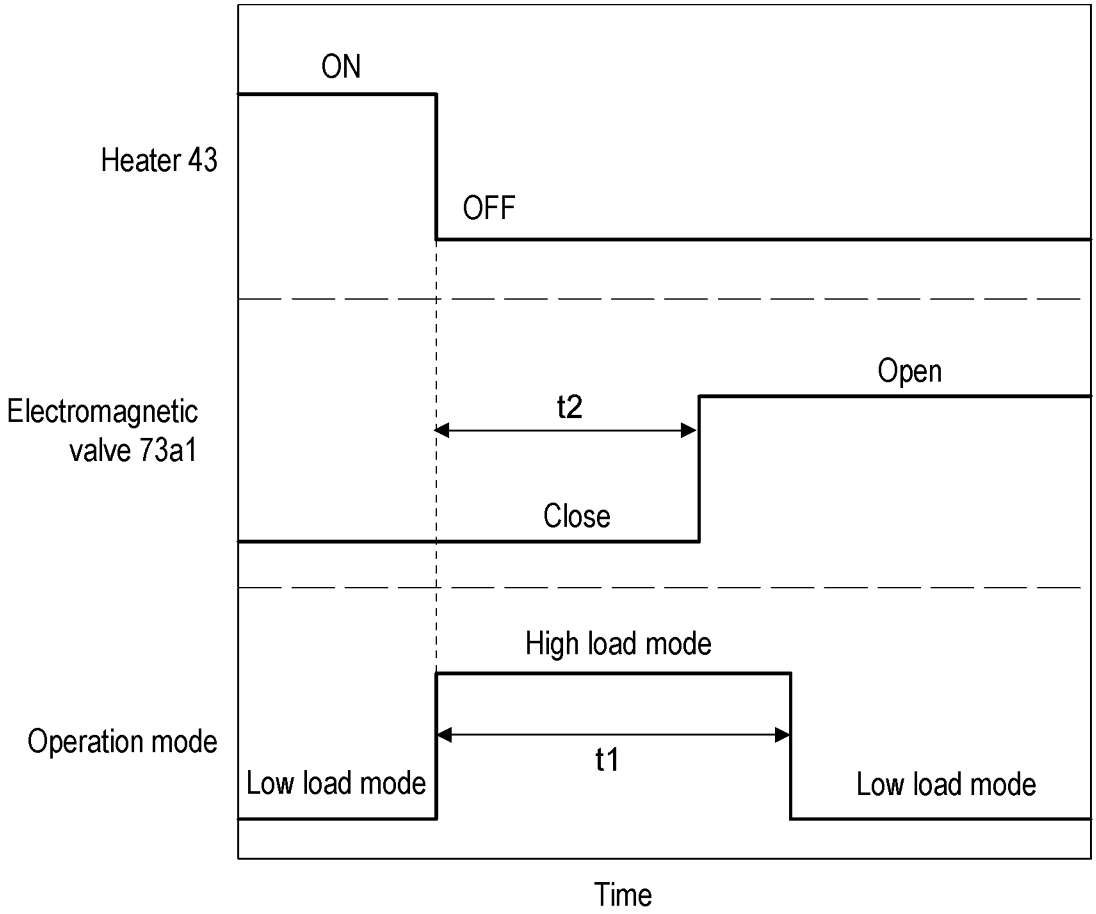
FIG. 9 is a timing chart illustrating stopping of heating by a heater 43, opening of an electromagnetic valve 73*a*1, and switching of an operation mode.

As illustrated in FIG. 9, at the same time as the heating of the build table 4 by the heater 43 is stopped, the operation mode of the refrigerant circulation device 6 is switched from the low load mode to the high load mode. After a predetermined standby time t2 has passed after switching to the high load mode, the refrigerant supply controller 88 opens the electromagnetic valve 73*a*1 and starts the supply of cooling water to the first cooler 44. The standby time t2 is set less than or equal to the high load duration time t1. Accordingly, the supply of cooling water to the first cooler 44 is started while the refrigerant circulation device 6 is operated in the high load mode or at the same time as the refrigerant circulation device 6 is switched from the high load mode to the low load mode. In the present example, the standby time t2 is set less than the high load duration time t1, and the supply of cooling water to the first cooler 44 is started during operation in the high load mode.

In this way, if the set temperature T1 of the build table 4 is relatively high, in anticipation of a rise in the temperature of the cooling water due to circulation in the first cooler 44, before the supply of cooling water to the first cooler 44 is started, the operation mode is switched to the high load mode, and the cooling water to be supplied is adjusted to a relatively low temperature. When the predetermined standby time t2 has passed after switching to the high load mode, the supply of cooling water to the first cooler 44 is started. Accordingly, even if the refrigerant circulation device 6 is introduced having cooling capacity corresponding to the general set temperature T1 of the build table 4 of about 120° C., the build table 4 can be efficiently cooled in manufacturing in which the set temperature T1 is relatively high, without increasing the number of the refrigerant circulation device 6. It is possible to maintain the temperature of the cooling water supplied to the second cooler 55 within the allowable range and avoid the occurrence of abnormality.

As illustrated in FIG. 9, at a time point when the high load duration time t1 has passed after switching to the high load mode, the mode switcher 65*a* switches the operation mode from the high load mode to the low load mode. By such a configuration, the operation of the refrigerant circulation device 6 in the high load mode can be minimized, and energy consumption in the refrigerant circulation device 6 can be suppressed.

The high load duration time t1 is preferably set longer than the standby time t2. As an example, if the standby time t2 is 150 seconds, the high load duration time t1 may be set to 180 seconds. In the case where the high load duration time t1 is set equal to the standby time t2 (that is, in the case of switching from the high load mode to the low load mode at the same time as the start of the supply of cooling water to the first cooler 44), since a temperature detected by the outlet temperature sensor 71*b* is much lower than the target refrigerant temperature at the time point when the operation mode is switched to the low load mode, after the cooling capacity of the cooling water drops sharply immediately after switching due to feedback control, the cooling capacity increases as the cooling water is returned from the first cooler 44. Such a sharp change in cooling capacity is not preferable from the viewpoint of energy efficiency in the refrigerant circulation device 6. By setting the high load duration time t1 longer than the standby time t2, and switching to the low load mode at a time point when a difference between the temperature detected by the outlet temperature sensor 71*b* and the target refrigerant temperature is reduced due to the return of cooling water from the first cooler 44, such a sharp change in cooling capacity can be avoided.

4. Method of Additive Manufacturing of Object

Figure 10:
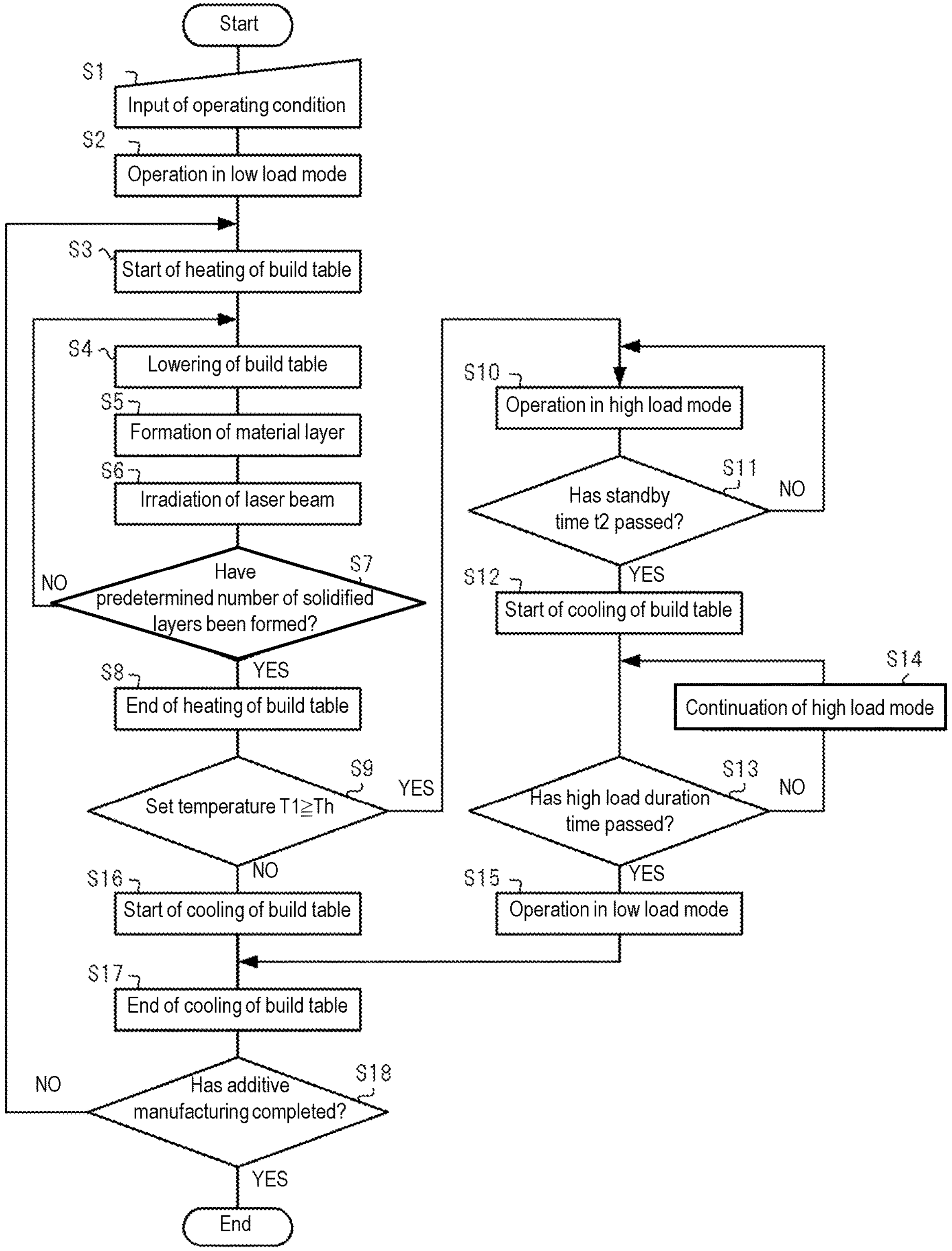
FIG. 10 is a flowchart illustrating an additive manufacturing procedure using the additive manufacturing apparatus 100.

A method of additive manufacturing of an object in which the additive manufacturing apparatus 100 is used is described with reference to FIG. 10. The method of additive manufacturing of the present embodiment includes a material layer formation process, a heating process, a solidification process, a refrigerant temperature adjustment process, and a cooling process.

In step S1, the operator inputs information necessary for determining an operating condition of the refrigerant circulation device 6 to the input part 64 of the control device 8. The input part 64 takes in the input information. The command part 65 determines a specific operating condition of the refrigerant circulation device 6 based on the input information and an operation command from the numerical control part 83. In step S2, based on the operating condition sent from the command part 65, the cooling capacity controller 66 starts operation of the refrigerant circulation device 6 in the low load mode. At this time point, the electromagnetic valve 73*a*1 provided in the first branch supply path 73*a* is controlled and closed by the refrigerant supply controller 88, and no cooling water is being supplied to the first cooler 44.

In step S3, the heating process of the build table 4 is started while no cooling water is being supplied to the first cooler 44. The heating controller 87 controls the heater 43 to heat the build table 4 to the predetermined set temperature T1. In step S4, the build table 4 on which the base plate 90 is placed is lowered to an appropriate position.

Figure 11:
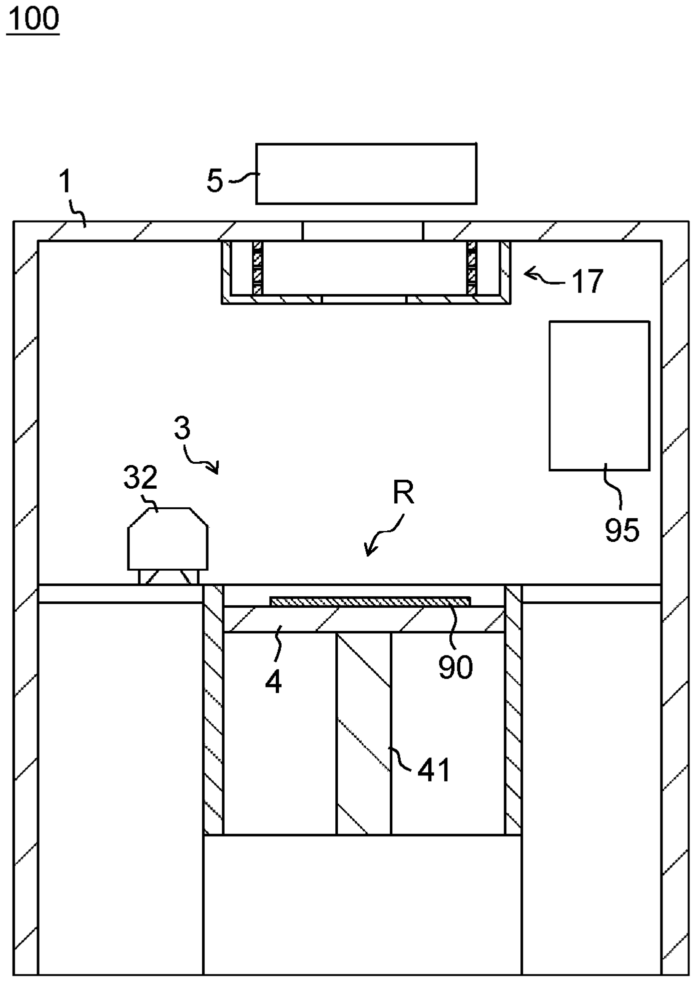
FIG. 11 is illustrating a method of additive manufacturing using the additive manufacturing apparatus 100, where the recoater head 32 standing by on the left side of the build area R is moving horizontally to the right side of the build area R.
Figure 12:
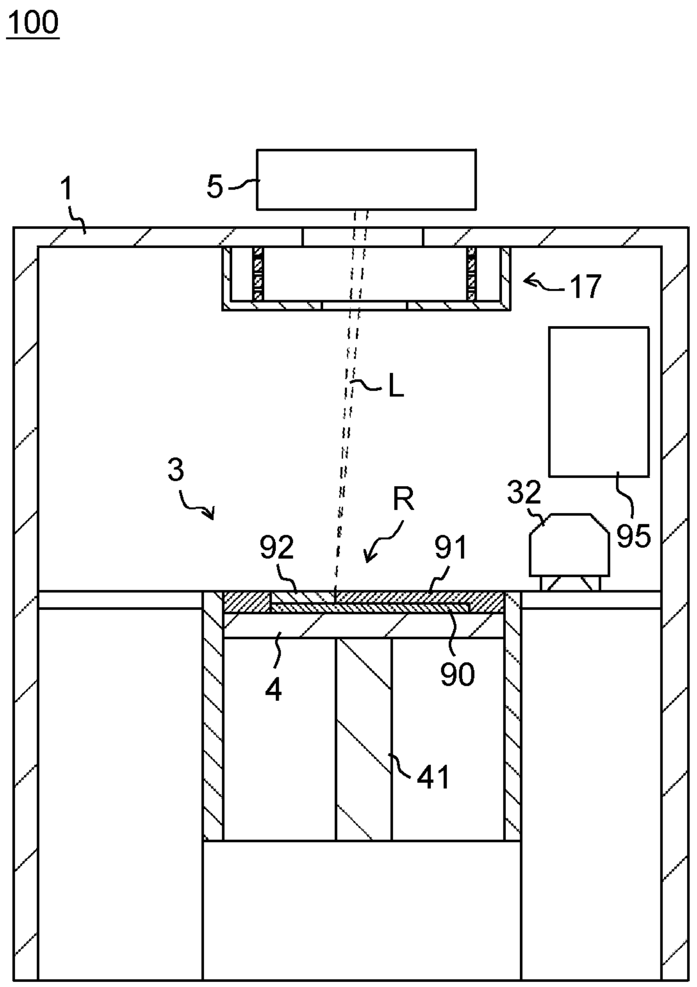
FIG. 12 is illustrating a method of additive manufacturing using the additive manufacturing apparatus 100, when the recoater head 32 is moved from the left side of the build area R to the right side of the build area R, the material layer 91 is formed to cover the solidified layer 92.

In step S5, the first material layer formation process is executed. By horizontally moving the recoater head 32 standing by on the left side of the build area R as illustrated in FIG. 11 to the right side of the build area R, the material powder is supplied onto the build table 4 and the first material layer 91 is formed as illustrated in FIG. 12. The material layer 91 is preheated to a temperature equivalent to the set temperature T1 by heat transferred from the build table 4.

In step S6, the first solidification process is executed. The first solidified layer 92 is formed. In step S7, the control device 8 determines whether a predetermined number of solidified layers have been formed. If the predetermined number of solidified layers have not been formed, the process returns to step S4 and the height of the build table 4 is lowered by the amount corresponding to one material layer 91.

In step S5, the second material layer formation process is performed. In FIG. 12, by horizontally moving the recoater head 32 standing by on the right side of the build area R to the left side, the second material layer 91 is formed to cover the first solidified layer 92. In step S6, the second solidification process is performed. By irradiating a predetermined irradiation area of the second material layer 91 with the laser beam L, the second material layer 91 is solidified, and the second solidified layer 92 is formed. The material layer formation process and the solidification process are repeatedly executed in this way.

In step S7, when the control device 8 determines that the predetermined number of solidified layers have been formed, the process proceeds to step S8 and the heating process is ended. The heating controller 87 controls the heater 43 to stop heating the build table 4.

In the refrigerant temperature adjustment step, the temperature of the cooling water supplied from the refrigerant circulation device 6 is adjusted based on the set temperature T1 of the build table 4. In step S9, the set temperature T1 is compared with a predetermined value Th. If the set temperature T1 is equal to or greater than the predetermined value Th, the numerical control part 83 outputs, to the refrigerant circulation controller 63, an operation command for switching the operation mode of the refrigerant circulation device 6. Th=140° C. is set. When the command part 65 of the refrigerant circulation controller 63 receives the operation command, in step S10, the mode switcher 65*a* switches the refrigerant circulation device 6 from the low load mode to the high load mode. In the high load mode, the cooling capacity controller 66 controls the heat exchanger 62 to cool the cooling water with higher cooling capacity than in the low load mode.

At a time point when the predetermined standby time t2 has passed in step S11, in step S12, the cooling process of the build table 4 is started. The electromagnetic valve 73*a*1 is opened by the refrigerant supply controller 88, and the cooling water is circulated between the refrigerant circulation device 6 and the first cooler 44. By supplying the cooling water to the first cooler 44, the build table 4 is cooled to the predetermined cooling temperature T2.

The high load mode continues in step S14 until the predetermined high load duration time t1 passes in step S13. At a time point when the high load duration time t1 has passed in step S13, the mode switcher 65*a* switches the refrigerant circulation device 6 from the high load mode to the low load mode in step S15.

In step S9, if the set temperature T1 is less than the predetermined value Th, the process proceeds to step S16, and the cooling process of the build table 4 is started while the refrigerant circulation device 6 is operated in the low load mode. The refrigerant supply controller 88 opens the electromagnetic valve 73*a*1 to circulate the cooling water between the refrigerant circulation device 6 and the first cooler 44, and the build table 4 is cooled to the predetermined cooling temperature T2.

When the cooling process of the build table 4 is ended in step S17, the process proceeds to step S18. If the additive manufacturing is not completed in step S18, the process returns to step S3. If the additive manufacturing is completed in step S18, the process is ended. During or after manufacturing, the solidified layer 92 may be subjected to machining by a cutting device 95. The cutting device 95 is provided, for example, in the chamber 1, and is configured by attaching a tool, for example, an end mill, to a head, in which the head may be moved horizontally and vertically.

5. Other Embodiments

The present invention can also be implemented in the following aspects.

Modification 1

In the above embodiment, the refrigerant circulation device 6 has two operation modes, the low load mode and the high load mode, and each of the operating conditions such as the high load duration time t1, the standby time t2, and the cooling capacity set value in the high load mode is a fixed value. However, the configuration of the operation mode is not limited thereto. Three or more operation modes may be provided. As an example, the refrigerant circulation device 6 may be configured to have a low load mode and a plurality of high load modes.

The refrigerant circulation device 6 may have a first high load mode and a second high load mode as the high load modes. The operating conditions may be set so that a standby time and a high load duration time in the second high load mode are respectively longer than the standby time and the high load duration time in the first high load mode. Alternatively, the operating conditions may be set so that the cooling capacity of the refrigerant circulation device 6 in the second high load mode is higher than the cooling capacity of the refrigerant circulation device 6 in the first high load mode. By providing a plurality of high load modes with different operating conditions in this way, the build table 4 can be cooled relatively efficiently according to the set temperature T1 of the build table 4.

Modification 2 to Modification 4

In the above embodiment, the control device 8 is configured to control the supply refrigerant temperature Tr based on the set temperature T1 of the build table 4. The control of the supply refrigerant temperature Tr and the configuration of the control device 8 are not limited thereto, and other configurations may be used.

As Modification 2, the control device 8 may be configured to control the supply refrigerant temperature Tr based on the set temperature T1 of the build table 4 and volume V of the build table 4. In this case, for example, the control device 8 may be configured to switch the operation mode of the refrigerant circulation device 6 from the low load mode to the high load mode when the set temperature T1 is equal to or greater than the predetermined value Th and the volume V of the build table 4 is equal to or greater than a predetermined value Vh. Alternatively, the control device 8 may be configured as follows by combination with the configuration of Modification 1. That is, if the set temperature T1 is equal to or greater than the predetermined value Th and the volume V of the build table 4 is less than the predetermined value Vh, the control device 8 switches the operation mode from the low load mode to the first high load mode; if the set temperature T1 is equal to or greater than the predetermined value Th and the volume V of the build table 4 is equal to or greater than the predetermined value Vh, the control device 8 switches the operation mode from the low load mode to the second high load mode. By considering the volume V in addition to the set temperature T1 of the build table 4 in this way, when the volume V of the build table 4 is large, it is possible to supply to the first cooler 44 a refrigerant whose temperature is adjusted to be relatively low by feedforward control in the high load mode.

As Modification 3, the control device 8 may be configured to control the supply refrigerant temperature Tr based on the set temperature T1 and the actual temperature T3 of the build table 4. In this case, for example, the control device 8 may be configured to switch the operation mode of the refrigerant circulation device 6 from the low load mode to the high load mode when the set temperature T1 is equal to or greater than the predetermined value Th (for example, 140° C.) or and the actual temperature T3 is equal to or greater than a predetermined value Ta (for example, 135° C.) based on a detection signal from a temperature sensor for detecting a temperature in the build table 4. Depending on the structure of the temperature adjuster 42, a difference may occur between the set temperature T1 of the build table 4 in the operation command for the heating controller 87 and the actual temperature T3 of the build table 4. By considering the set temperature T1 and the actual temperature T3 of the build table 4, relatively accurate control can be performed.

As Modification 4, the control device 8 may be configured to control the supply refrigerant temperature Tr based on the set temperature T1 of the build table 4 and a height of a build object. In this case, for example, the control device 8 may be configured to switch the operation mode of the refrigerant circulation device 6 from the low load mode to the high load mode when the set temperature T1 is equal to or greater than the predetermined value Th and the height of the build object is equal to or greater than a predetermined value. Alternatively, the control device 8 may be configured as follows by combination with the configuration of Modification 1. That is, if the set temperature T1 is equal to or greater than the predetermined value Th and the height of the build object is less than the predetermined value, the control device 8 switches the operation mode from the low load mode to the first high load mode; if the set temperature T1 is equal to or greater than the predetermined value Th and the height of the build object is equal to or greater than the predetermined value, the control device 8 switches the operation mode from the low load mode to the second high load mode. By considering the height of the build object (volume of the build object) in addition to the set temperature T1 of the build table 4 in this way, when the height of the build object is large, it is possible to supply to the first cooler 44 a refrigerant whose temperature is adjusted to be relatively low by feedforward control in the high load mode.

Various embodiments according to the present invention have been described above, and these are presented as examples and are not intended to limit the scope of the invention. The novel embodiment can be implemented in various other forms, and various omissions, replacements, and changes can be made without departing from the gist of the invention. The embodiment and its modifications are included in the scope and gist of the invention, and are included in the scope of the invention described in the claims and the equivalent scope thereof.

What is claimed is:

1. An additive manufacturing apparatus, comprising:

a build table, on which a material layer is formed by supply of material powder;

an irradiator, irradiating the material layer with an energy beam and forming a solidified layer;

a temperature adjuster, comprising a heater that heats the build table to a predetermined set temperature and a first cooler that cools the build table;

a refrigerant circulation device, adjusting a temperature of a refrigerant and circulating the refrigerant between the refrigerant circulation device and the first cooler, wherein the refrigerant circulation device and the first cooler are connected by a refrigerant supply path for supplying the refrigerant to the first cooler, and the refrigerant supply path is provided with a refrigerant supply valve; and a control device, configured to control a supply refrigerant temperature, wherein the supply refrigerant temperature is a temperature of the refrigerant supplied from the refrigerant circulation device based on the predetermined set temperature, wherein the control device is configured to control the supply refrigerant temperature by manipulating cooling capacity of the refrigerant circulation device based on the predetermined set temperature, and the refrigerant circulation device has a low load mode and a high load mode as an operation mode, wherein the control device comprises a refrigerant supply controller, a high load duration time setting part, and a mode switcher, and the high load duration time setting part sets a high load duration time, wherein the high load duration time is a duration time per operation of the refrigerant circulation device in the high load mode, and the mode switcher switches the operation mode based on the predetermined set temperature and the high load duration time, and wherein the refrigerant circulation device adjusts the temperature of the refrigerant with higher cooling capacity in the high load mode than in the low load mode, and the refrigerant supply controller is configured to control supply of the refrigerant to the first cooler by opening and closing the refrigerant supply valve, wherein the mode switcher is configured to switch the refrigerant circulation device from the low load mode to the high load mode with the refrigerant supply valve closed, and the refrigerant supply controller is configured to open the refrigerant supply valve and start the supply of the refrigerant to the first cooler after a predetermined standby time has passed since the switching to the high load mode is performed, wherein the high load duration time is longer than the predetermined standby time.

2. The additive manufacturing apparatus according to claim 1, wherein the irradiator comprises a laser oscillator that outputs the energy beam;

the additive manufacturing apparatus further comprises a second cooler that cools the laser oscillator; and the refrigerant circulation device circulates the refrigerant between the refrigerant circulation device and the second cooler.

3. The additive manufacturing apparatus according to claim 2, further comprising:

a temperature monitor, monitoring the temperature of the refrigerant supplied to the second cooler.

4. The additive manufacturing apparatus according to claim 1, wherein the control device is configured to control the supply refrigerant temperature based on the predetermined set temperature and volume of the build table.

5. The additive manufacturing apparatus according to claim 1, wherein the control device is configured to control the supply refrigerant temperature based on the predetermined set temperature and a height of a build object on the build table.

6. The additive manufacturing apparatus according to claim 1, wherein the refrigerant circulation device is a chiller.

* * * * *